United States Patent [19]

Takagi

[11] Patent Number: 5,017,768
[45] Date of Patent: May 21, 1991

[54] OPTICAL FOCUSING CONTROL APPARATUS

[75] Inventor: Masaaki Takagi, Tokyo, Japan

[73] Assignees: Copal Company Limited, Tokyo; Fujitsu Limited, Kanagawa, both of Japan

[21] Appl. No.: 392,114

[22] Filed: Aug. 10, 1989

[30] Foreign Application Priority Data

Sep. 14, 1988 [JP] Japan .................................. 63-228397
Sep. 14, 1988 [JP] Japan .................................. 63-228398
Sep. 14, 1988 [JP] Japan .................................. 63-228399

[51] Int. Cl.$^5$ .......................... G01J 1/20; G11B 7/00
[52] U.S. Cl. ................................ 250/201.5; 369/44.41
[58] Field of Search ......................... 250/201.5, 201.4; 369/44.41, 44.12, 44.11, 44.27

[56] References Cited

U.S. PATENT DOCUMENTS

| | | | |
|---|---|---|---|
| 4,724,533 | 2/1988 | Ohara et al. | 250/201.5 |
| 4,742,218 | 5/1988 | Nakamura et al. | 250/201.5 |
| 4,764,912 | 8/1988 | Ando et al. | 250/201.5 |
| 4,801,794 | 1/1989 | Kowalski et al. | 250/201.5 |
| 4,843,603 | 6/1989 | Prikryl | 250/201.5 |
| 4,862,442 | 8/1989 | Tadokoro et al. | 250/201.5 |

FOREIGN PATENT DOCUMENTS 63-15819 10/1988 Japan .
63-317930 12/1988 Japan .

Primary Examiner—David C. Nelms
Assistant Examiner—Michael Messinger
Attorney, Agent, or Firm—Finnegan, Henderson, Farabow, Garrett & Dunner

[57] ABSTRACT

Light is condensed on a recording medium by an objective lens, and light reflected from the recording medium passes through the objective lens and is split into light along two optical paths via a condenser lens and beam splitter. A light-receiving surface having an area smaller than that of the irradiation pattern of the returned light when the objective is focused is disposed on the inner side of a focal point on one optical path, and an identical light-receiving surface is disposed on the outer side of a focal point on the other optical path. The arrangement is such that the photoelectric outputs of the two light-receiving surfaces coincide when the objective lens is focused. Preferably, the light-receiving surface is divided into four portions by a straight line, which is obtained by projecting the track direction of the recording medium, and a region having line symmetry with respect to the straight line and an area smaller than that of the irradiation pattern when the objective is focused. A tracking error signal of the objective lens is obtained by correcting a difference signal between light-receiving surfaces on the inner side by a low-frequency component of a difference signal between light-receiving surfaces on the outer side.

1 Claim, 1 Drawing Sheet

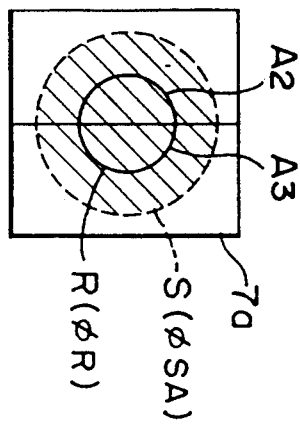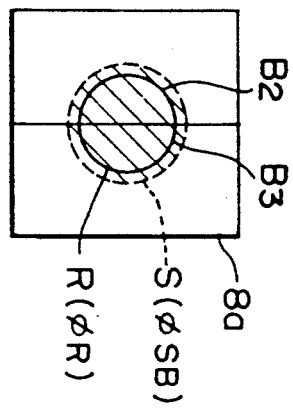
FIG. 3(A) (A−B)<0
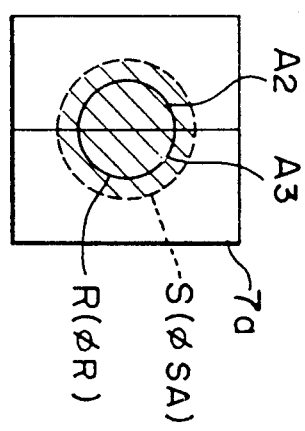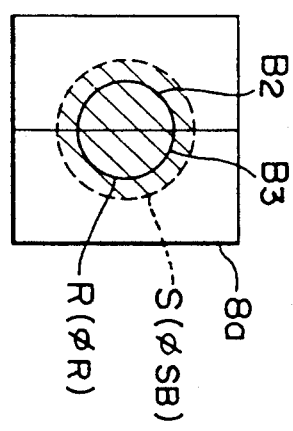
FIG. 3(B) (A−B)=0
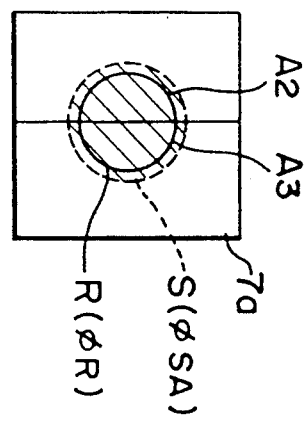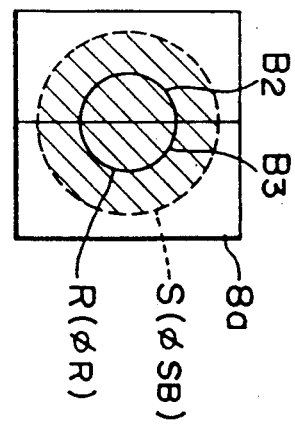
FIG. 3(C) (A−B)>0

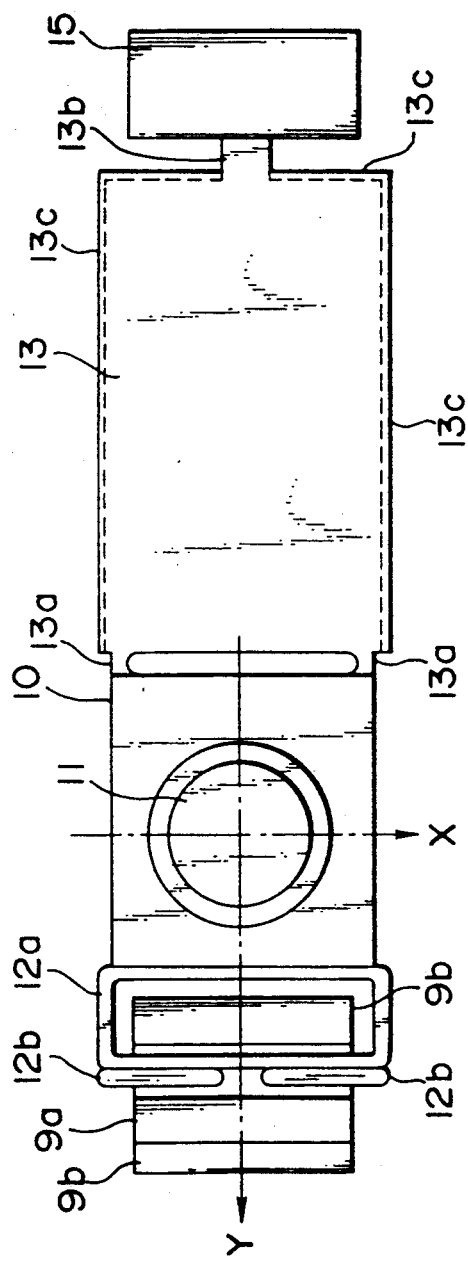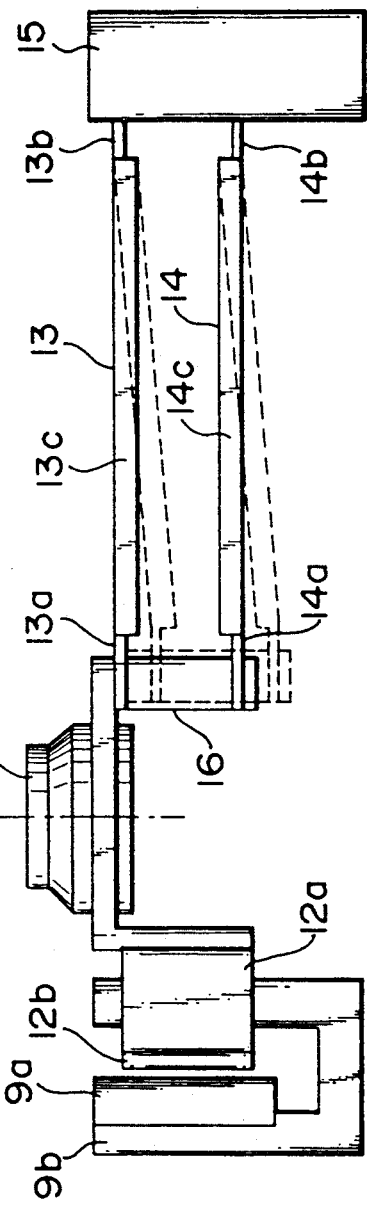
FIG. 8(A)
FIG. 8(B)

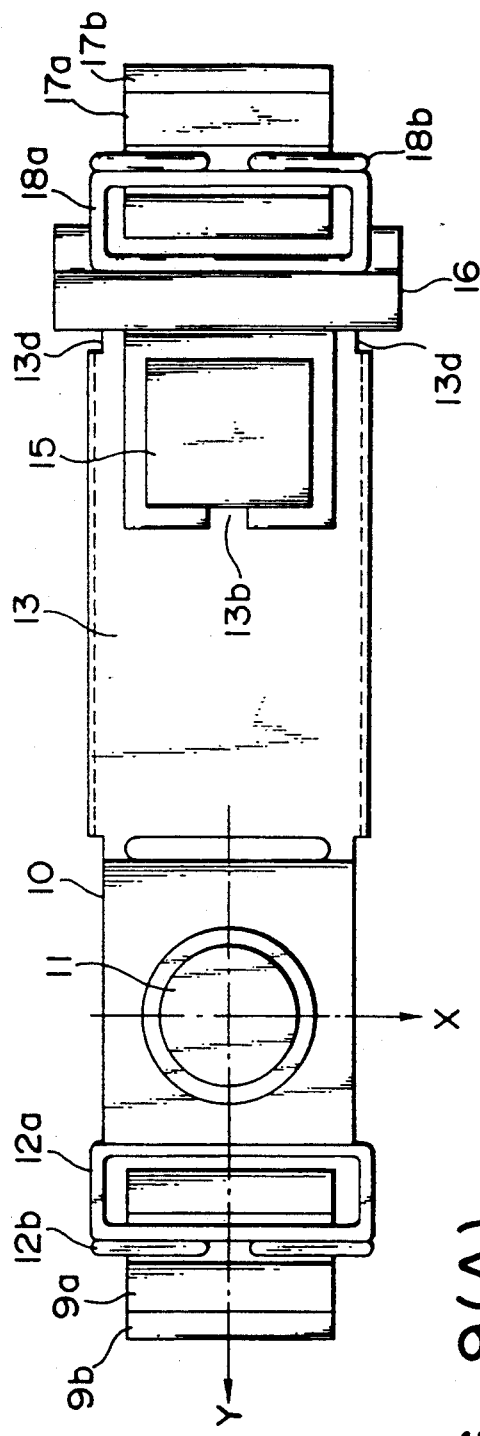
F I G. 9(A)
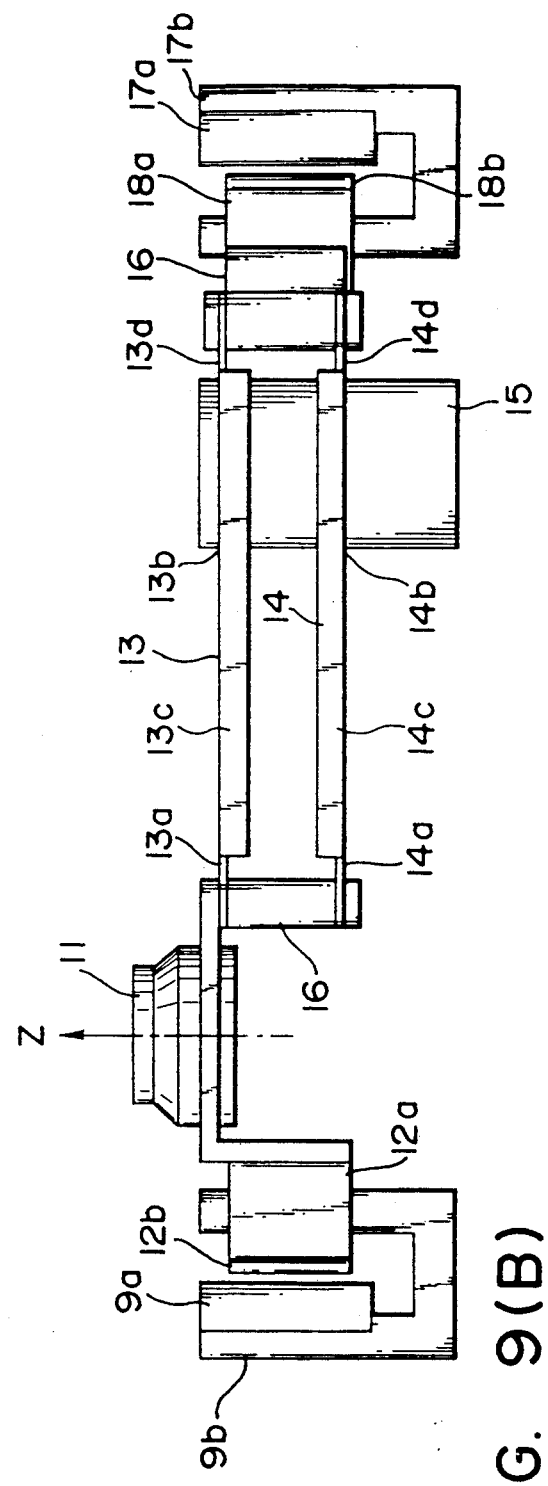
F I G. 9(B)

OPTICAL FOCUSING CONTROL APPARATUS

BACKGROUND OF THE INVENTION

This invention relates to an optical pickup apparatus and, more particularly, to an optical pickup apparatus in which light is condensed on a recording medium by an objective lens, light reflected from the recording medium passes through the objective lens so as to be condensed thereby to irradiate detectors, and the objective lens is positionally controlled based on photoelectric outputs produced by the detectors.

In an apparatus of this type, problems are encountered in terms of improving the accuracy and reliability of focusing control and tracking control of the objective lens. A solution to these problems is closely related to the structure of an actuator which supports the objective lens.

In the prior art, known methods of controlling focusing include an astigmatism method, a critical angle method and a knife-edge method. With these methods, however, focus detection is performed by the distribution of an amount of light on a single split detector. Though the apparatus is simple in structure, disadvantages are malfunctions caused by scratches or contaminants on a disk surface, a large amount of influence of a groove, etc.

If, say, the aforementioned astigmatism method is implemented in an optical arrangement in which an optical path is split into two optical paths and the outputs of these two optical paths are inverted, the foregoing disadvantages can be eliminated by taking the difference between the two outputs. However, this expedient requires very fine focus adjustment in each of the optical paths. As a result, the labor involved in such adjustment is twice that of the prior art.

Moreover, if the optical pickup is used for a magneto-optical disk, splitting of the light path is performed by polarization. As a consequence, the effects of birefringence of the disk cannot be ignored. More specifically, if the amount of light on each optical path varies uniformly, no problems arise. In actuality, however, the influence of birefringence of the disk is dependent upon the angle at which light is incident upon the disk and becomes more pronounced as the angle of incidence increases. Accordingly, though not much influence is received near the optic axis of each optical path, the variation in the amount of light is great at the peripheral portions and, as a result, accurate detection of focusing cannot be performed with the prior-art method.

Further, in an apparatus of this type, a tracking servo operation is performed by applying a displacement (a lens shift) in the radial direction of the disk to an actuator (i.e., the objective lens). In the lens-shifted state, however, the center of the light condensed on the disk surface and the center of the luminous flux returned by reflection deviate from the center (optic axis) of the optical head. As a result, the irradiation pattern of the returned luminous flux causes this deviation to show up on the detector and appears as a so-called offset quantity in the output of the detector. This has an adverse effect upon the tracking servo operation. Accordingly, it is necessary to detect and cancel the offset by some method. In the prior art, a position sensor is separately provided to detect the amount of shift in the objective lens. However, separately providing the position sensor requires additional space and wiring and leads to a more complicated structure.

In the conventional apparatus, the objective lens is fixed to the actuator, which is driven in the focusing direction and radial direction of the disk. The conventional actuator is of two types, namely a shaft sliding type and a leaf spring type. The shaft sliding-type actuator has the following drawbacks: (1) resonance and a phase shift are caused by shaft backlash; (2) the empty weight of the set-up has an influence in the focusing direction; and (3) friction at the shaft impedes smooth displacement. With the leaf spring-type actuator, the disadvantages are as follows: (4) there is the possibility of causing vibration in directions other than the focusing direction and radial direction; (5) though the disadvantage (4) does not occur in a hinged arrangement, the provision of separate hinges for the focusing direction and track direction results in a complicated structure; and (6) the empty weight of the set-up has an influence in the focusing direction and track direction.

SUMMARY OF THE INVENTION

An object of the present invention is to provide an optical pickup apparatus capable of performing accurate focusing detection.

Another object of the present invention is to provide an optical pickup apparatus which is not susceptible to the adverse effects of birefringence even if the pickup is for a magneto-optical disk.

Still another object of the present invention is to provide an optical pickup apparatus capable of detecting a variety of signals effective in tracking control.

A further object of the present invention is to provide an optical pickup apparatus having an actuator in which vibration and the effects of empty weight do not appear.

In accordance with the invention, the foregoing objects are attained by providing an optical pickup apparatus in which light is split into first and second optical paths by a beam splitter, a first detector is disposed on the first optical path on the inner side of a focal point of a condenser lens, a second detector is disposed on the second optical path on the outer side of the focal point of the condenser lens, the first detector includes a light-receiving surface having a center situated on an optic axis of the first optical path and an area smaller than that of an irradiation pattern of returned light emerging from the condenser lens when an objective is focused, and the second detector includes a light-receiving surface having a center situated on an optic axis of the second optical path and an area smaller than that of an irradiation pattern of returned light emerging from the condenser lens when the objective is focused, the first and second detectors being disposed in such a manner that respective photoelectric outputs thereof coincide when the objective lens is focused.

By virtue of this arrangement, the areas of the irradiation patterns on the first and second detectors are equal when the objective lens is focused, and the light intensities per unit area are also equal for the two detectors. Accordingly, the photoelectric outputs coincide as well. When the object lens is on the side near the focal point, the area of one irradiation pattern increases and that of the other irradiation pattern decreases. When these irradiation patterns are received by the light-receiving surfaces having the areas smaller than those of the respective irradiation patterns when the objective is focused, the light intensity per unit area of one light-receiving surface always decreases and that of the other light-receiving surface always increases. Therefore, the photoelectric outputs also vary uniformly in accordance therewith. When the objective lens is on the side remote from the focal point, the foregoing is reversed.

Further, in order to attain the foregoing objects, the optical pickup apparatus of the present invention is such that the light-receiving surface of the detector is divided into four portions by a straight line, which is obtained by projecting the track direction of the recording medium, and a region having line symmetry with respect to the straight line and an area smaller than that of the irradiation pattern of returned light condensed and projected on the detector when an objective is focused, a difference signal of the light-receiving surfaces on the inner side being adopted as a tracking error signal of the objective lens, and a difference signal of the light-receiving surfaces on the outer side being adopted as a displacement detection signal of the objective lens.

Thus, when a radial displacement is not applied to the objective lens and the center thereof is directly above a track, the returned luminous flux is imaged substantially line-symmetrically, with the straight line of the quartered light-receiving surface serving as a boundary. Accordingly, the detection outputs of the light-receiving surfaces are balanced, and neither a difference signal of the light-receiving surfaces on the inner side nor a difference signal of the light-receiving surfaces on the outer side is produced. As a result of applying a radial displacement to the objective lens, the returned luminous flux is imaged, with approximate line symmetry, about a boundary which is a straight line shifted to the left or right of the straight line of the quartered light-receiving surface when the center of the objective lens is situated directly above a track in a state lens-shifted from the optic axis serving as a reference. Accordingly, though the balance of the detection outputs of the light-receiving surfaces is upset, the detection outputs produced by the inner-side light-receiving surfaces having an area smaller than that of the returned luminous flux are affected only slightly by a certain degree of lens shift. Meanwhile, since the portions of the inner-side light-receiving surfaces are removed from the portions of the outer-side light-receiving surfaces, the detection outputs produced by the outer-side light-receiving surfaces well reflect the amount of lens shift from the beginning of the lens shift. Here the difference signal of the light-receiving surfaces on the inner side is adopted as a tracking error signal of the objective lens, and the difference signal of the light-receiving surfaces on the outer side is adopted as a radial displacement detection signal of the objective lens.

Further, in order to attain the foregoing objects, the optical pickup apparatus of the present invention includes a plurality of rigid connecting members arranged in parallel with one another, one end of each connecting member is connected to an objective lens by a first hinge portion capable of flexing in a spacing direction between the connecting members but being substantially non-flexible in a direction perpendicular to the spacing direction, the other end of each connecting member is connected to a stationary object by a second hinge portion capable of flexing in both the spacing direction and the direction perpendicular thereto, the objective lens is displaced in a focusing direction by flexing the first and second hinge portions in the spacing direction, and in a radial direction by flexing only the second hinge portion in the direction perpendicular to the spacing direction.

Thus, when the objective lens is displaced in the focusing direction, the first and second hinge portions are each flexed in the spacing direction to displace the objective lens without skewing the optic axis of the objective lens. In addition, when the objective lens is displaced in the radial direction, only the second hinge portion is flexed in the radial direction, without the first hinge portion being so flexed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3(A), 3(B) and (C) are views showing the relationship between the focused/unfocused state of an objective lens and a focus error signal;

FIG. 8(A) is a top view of an actuator portion of the embodiment;

FIG. 8(B) is a side view of the actuator portion of the embodiment;

FIG. 9(A) is a top view of an actuator portion of another embodiment; and

FIG. 9(B) is a side view of the actuator portion of the other embodiment.

DESCRIPTION OF THE PREFERRED EMBODIMENTS

Embodiments of the present invention will now be described in detail with reference to the accompanying drawings.

Figure 1:
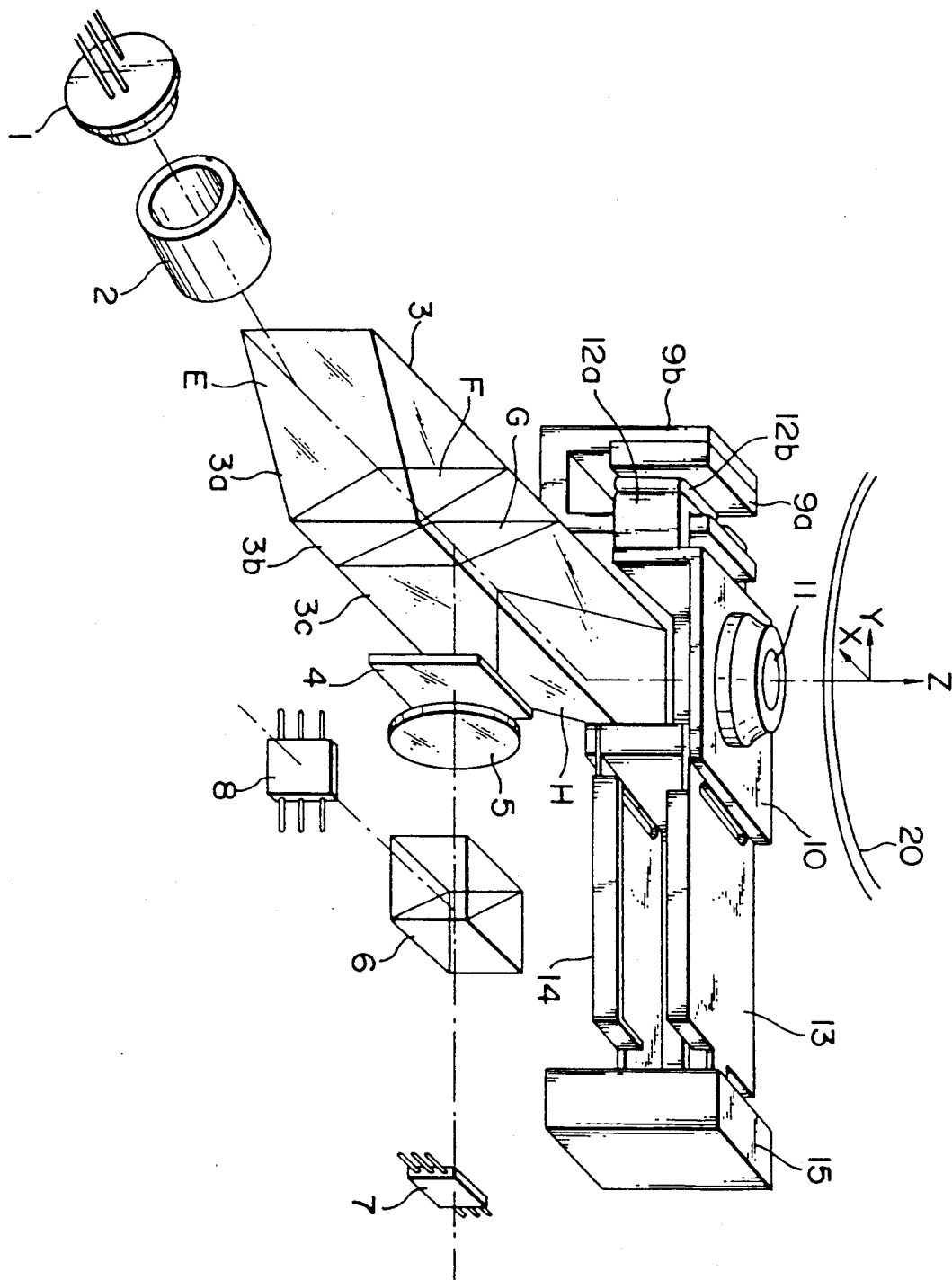
FIG. 1 is an external perspective view showing an optical head portion of an optical pickup apparatus according to an embodiment of the invention.

FIG. 1 is an external perspective view showing an optical head portion of an optical pickup apparatus according to an embodiment of the invention. Shown in FIG. 1 are a semiconductor laser (LD) 1 serving as a light source, a collimater lens 2 for forming the light emitted by the LD 1 into a parallel luminous flux, an optical block 3 which includes a beam-shaping prism 3a and a non-phase-differential polarized beam splitter (a boundary G between glasses 3b, 3c), a half-wave plate 4 for changing the polarization plane of luminous flux returned from a disk 20, a condenser lens 5 for condensing the returned luminous flux, a polarizing beam splitter (PBS) 6 for splitting the returned luminous flux into two systems (a P component and an S component), and signal detectors 7, 8.

Numeral 10 denotes an actuator body supported so as to be movable along the rotational axis (Z axis) of the disk 20 and in the radial direction (along the X axis). Numeral 11 denotes an objective lens secured to the actuator 10 for condensing the LD light onto the disk surface and rendering the reflected light into a parallel luminous flux. Also shown in FIG. 1 are a magnet 9a secured to an optical head seek mechanism, not shown, a magnetic yoke 9b which forms the magnetic circuit of the magnet 9a, a focusing coil 12a for driving the actuator 10 in the focusing direction (along the Z axis), a tracking coil 12b for driving the actuator 10 in the radial direction (along the X axis), actuator holding members 13, 14 each comprising a spring member, and a mounting member 15 secured to the seek mechanism for mounting the holding members 13 and 14.

The entirety of the optical head portion of the embodiment is made to seek in the radial direction by the seek mechanism, not shown.

Figure 2:
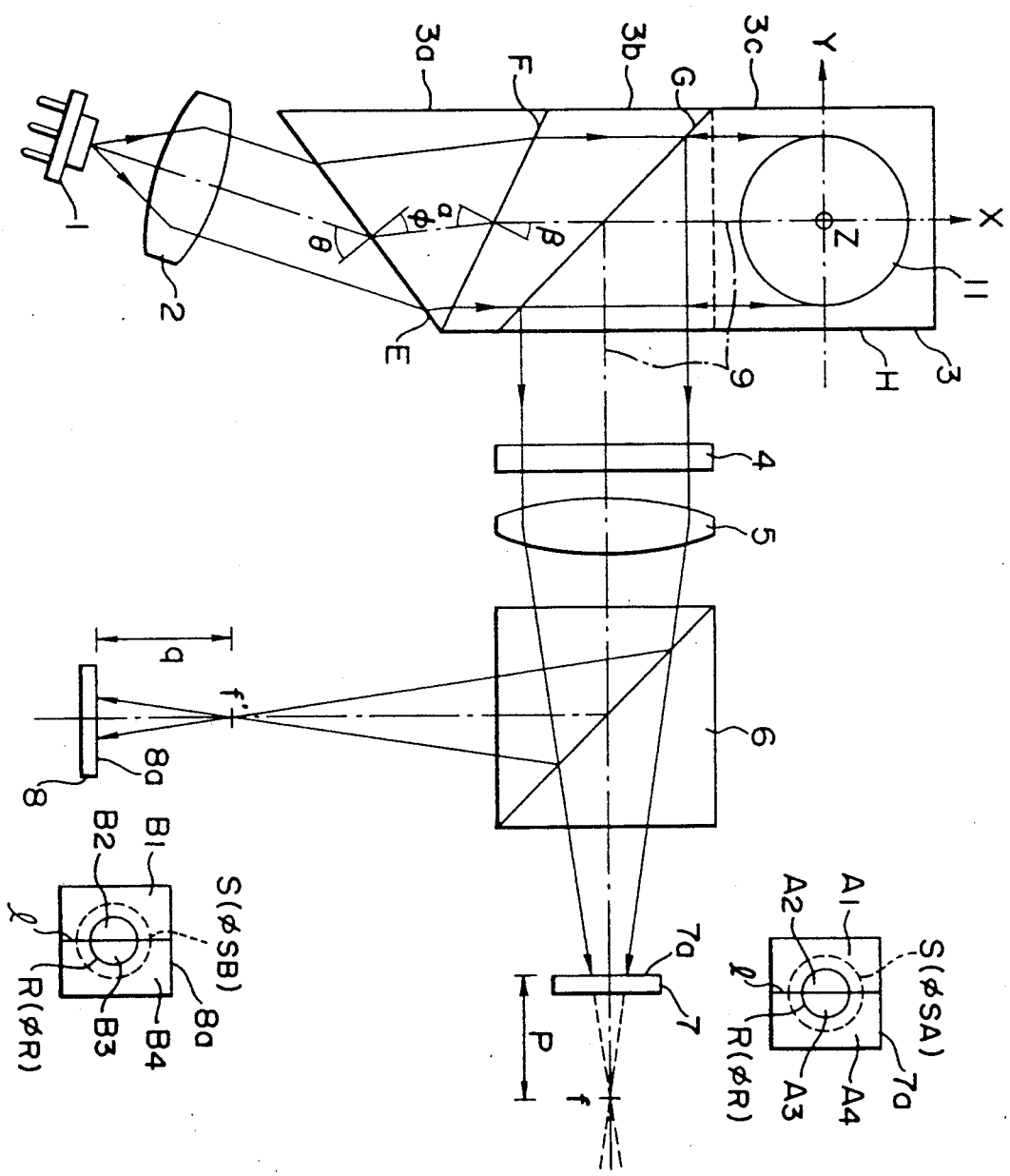
FIG. 2 is a view for describing optical paths of the optical head portion.

FIG. 2 is a view for describing the optical paths of the optical head portion. The LD light emitted by the LD 1 is made a parallel luminous flux by the collimater lens 2. Owing to the nature of the LD light, the cross section of the luminous flux generally exhibits an elliptical intensity distribution. In this embodiment, the cross section is corrected into a perfect circle by the beam-shaping prism 3a. More specifically, if the major axis of the ellipse is perpendicular to the plane of the drawing, the LD luminous flux is incident at an angle $\theta$ upon a surface E of the beam-shaping prism 3a, which is made of the material BK7 (BSC7), by way of example, and the flux is refracted at a refraction angle $\phi$. The beam diameter is thus enlarged in the direction of the minor axis by $COS\phi/COS\theta$ to form an approximate circle.

In general, the wavelength $\lambda$ of the LD light changes somewhat depending upon temperature and the intensity of generated light. In consequence, the refraction angle $\phi$ also changes and so does the optic axis 9 of the optical head. Accordingly, the glass 3b, such as the material SF11 (FD11), having wavelength-dependence and temperature-dependence with regard to the refractive index n, is provided. The LD light is incident upon the boundary F of the glasses 3a, 3b at an incidence angle $\alpha$, and the light is refracted at a refraction angle $\beta$. Compensation is thus made for the wavelength- dependence and temperature-dependence of the LD light.

The boundary G between the glasses 3b, 3c serves as a non-phase-differential polarized beam splitter. P-polarized light from the LD 1 is transmitted through this boundary at a rate of 70-80%, and almost all of the S-polarized light is reflected. The transmitted P-polarized light is incident at angle of 45° on the bottom inclined mirror coating face H of the glass 3c and is almost reflected at the mirror coating face H. The luminous flux therefore rises at a right angle (along the Z axis) and is emerges from the optical block 3. The luminous flux then impinges upon the objective lens 11 supported by the actuator 10 and is condensed on the information recording surface of the disk 20 by the objective lens 11. The luminous flux reflected from the disk surface is again formed into parallel luminous flux (returned luminous flux) by the objective lens 11.

When a beam spot is reflected at the information recording surface of a disk in a magneto-optical disk system, the system is acted upon by the Kerr effect due to vertical magnetic charges (N or S) forming the information bits, and the polarization plane tilts by a Kerr rotational angle $\pm\Delta\theta k$. The returned luminous flux which has been polarized re-enters the optical block 3 and is incident upon the non-phase-differential polarized beam splitter G. However, since the polarization plane is tilted by $\pm\Delta\theta k$ due to the Kerr effect, 20-30% of the P component is reflected, and the S component is reflected as well. More specifically, the P component is $R_p\cos\Delta\theta k$, and the S component is $\pm R_s\sin\Delta\theta k$.

The luminous flux reflected by the non-phase-differential polarized beam splitter G passes through the half-wave plate 4 with its crystal axis inclined by 22.5° with respect to the P component (or S component), and the polarization plane thereof is tilted by about 45° with respect to the PBS 6. When disk information is placed on this luminous flux, the polarization plane becomes $$45° \pm \tan^{-1}\left(\frac{R_s}{R_p}\tan\Delta\theta k\right)$$

Further, the returned luminous flux passes through the condenser lens 5 and is split into P and S components by the PBS 6. One component is condensed on the detector 7, which is provided on the inner side of a focal point f of one optical path, and the other component is condensed on the detector 8, which is provided on the outer side of a focal point f' of the other optical path.

Focusing position control of objective lens

In FIG. 2, f and f' denote the focal points (f=f') of the two optical paths of condenser lens 5. A light-receiving surface 7a is situated a distance p in front of the focal point f, and a light-receiving surface 8a is situated a distance q in back of the focal point f'.

The light-receiving surface 7a is divided into four areas $A_1$ through $A_4$ by a straight line l, which corresponds to a straight line obtained by projecting the track (Y) direction of the disk 20, and a circle R of diameter $\phi_R$ whose center is the approximate midpoint (which coincides with optic axis 9) of the straight line l. The light-receiving surface 8a is also divided into four areas $B_1$ through $B_4$ equal to those of the light-receiving surface 7a.

The shapes of the divided areas are such that a tracking error signal (TES), described below, can be detected. If only focusing detection is taken into account, it will suffice if the divided shapes are circles A and B ($A=A_2+A_3$, $B=B_2+B_3$) each of diameter $\phi_R$, with division by the straight line l not being necessary.

Assume that the spot diameters of the returned luminous fluxes are $\phi_{SA}$, $\phi_{SB}$ when the objective is focused. The distance p will be decided in a range where $\phi_{SA}>\phi_R$ is satisfied, and the distance q will be decided in a range where $\phi_{SB}>\phi_R$ is satisfied. Preferably, it is arranged so that the spot diameters $\phi_{SA}$, $\phi_{SB}$ sufficiently exceed the diameter $\phi_R$ of the circle R when the objective lens 11 is focused, and the distances p, q ($p\approx q$) should be decided in such a manner that a detected light quantity A ($=A_2+A_3$) and a detected light quantity B ($=B_2+B_3$) become equal.

FIGS. 3(A)-(C) are views illustrating the relationship between the focused/unfocused state of the objective lens 11 and a focus error signal (FES). Here the FES is a difference signal (A−B) between the detected light quantities A and B.

FIG. 3(B) illustrates a state in which the center of the objective lens 11 is directly above a track and is situated at the focusing point. Since the center of the objective lens 11 is located immediately above the track, the light intensities within the spots S are approximately uniform. Further, since the objective lens 11 is located at the focusing point, the spot diameters satisfy the relations $\phi_{SA}>\phi_R$, $\phi_{SB}>\phi_R$, and $\phi_{SA}=\phi_{SB}$, and the light intensities per unit area are approximately equal. Accordingly, the detected light quantities are related as follows: $A \approx B$, and the FES is approximately zero.

FIG. 3(A) illustrates a state in which the center of the objective lens 11 is directly above a track and is situated on a side near the focal point. When the objective lens 11 is on the side near the focal point, the spot diameters are related by the inequality $\phi_{SA} > \phi_{SB}$, the light intensity per unit area decreases for the light-receiving surface 7a and increases for the light-receiving surface 8a (where $\phi_{SB} \geq \phi_R$). Accordingly, the relation $A < B$ is satisfied at all times and the FES is negative.

FIG. 3(C) illustrates a state in which the center of the objective lens 11 is directly above a track and is situated on a side remote from the focal point. When the objective lens 11 is on the side remote from the focal point, the spot diameters are related by the inequality $\phi_{SA} < \phi_{SB}$, the light intensity per unit area increases for the light-receiving surface 7a (where $\phi_{SA} \geq \phi_R$) and decreases for the light-receiving surface 8a. Accordingly, the relation $A > B$ is satisfied at all times and the FES signal is positive.

Thus, a difference between quantities which increase and decrease in conformity with a minute change in the distance between the objective lens and the disk surface, with the focusing position of the objective lens 11 serving as the boundary, is optically detected. As a result, the minute change is extracted in an optically amplified form.

Further, since the effects of scratches or irregularities in the disk surface appear equally in the detectors of the two systems, these effects are cancelled.

In addition, disk birefringence appears to a marked degree when the angle of incidence relative to the disk is large (near the outer periphery of the returned luminous flux). In the present embodiment, however, the effects of birefringence are mitigated because use is made of the vicinity near the center of the luminous flux (the area inside the circle R).

Figure 4:
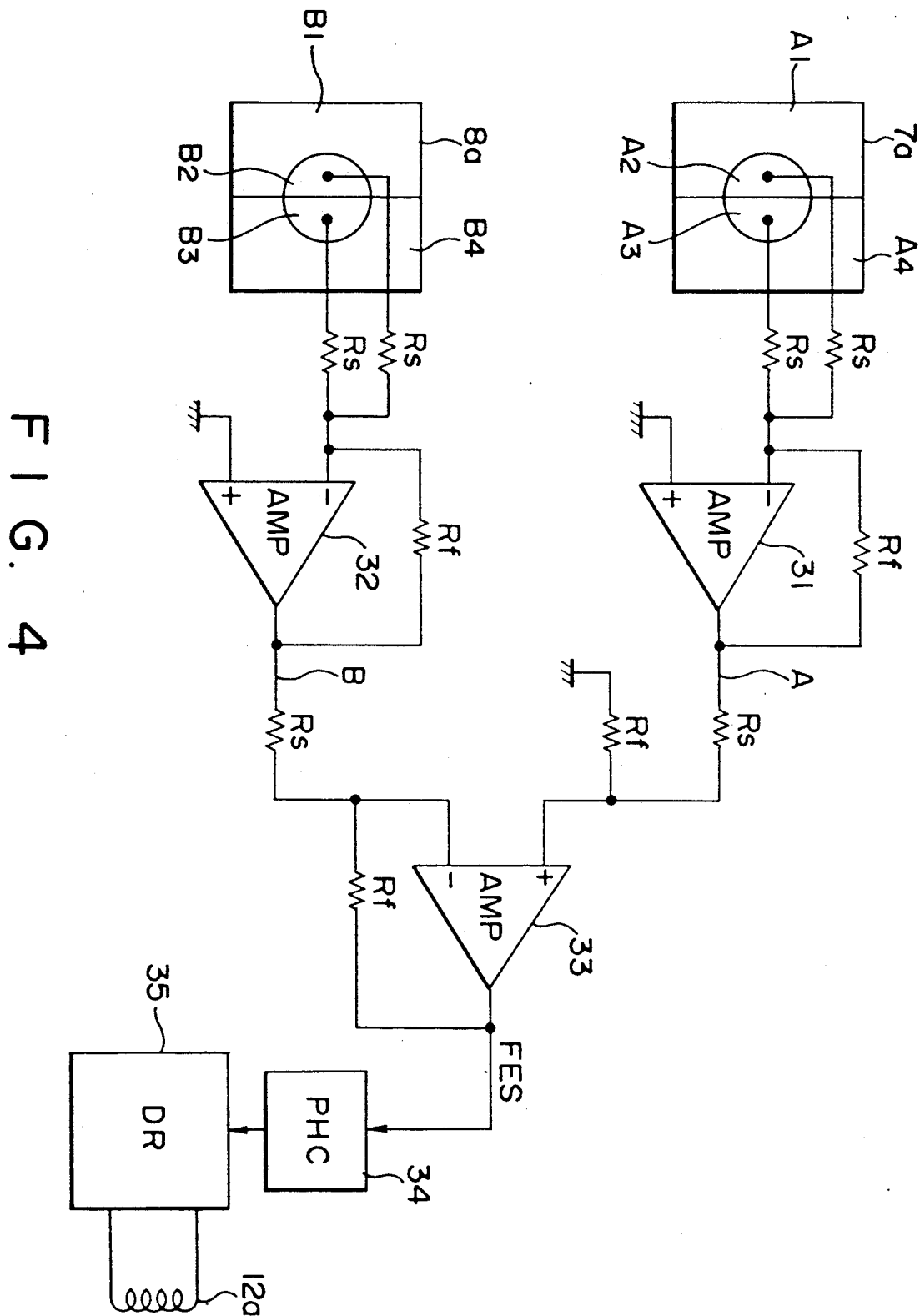
FIG. 4 is a circuit diagram showing a focusing position control circuit according to the embodiment.

FIG. 4 is a circuit diagram of a focusing position control circuit according to the present embodiment. A signal $(A_2 + A_3)$ indicating the sum of the areas $A_2$, $A_3$ at the light-receiving surface 7a is amplified into a signal A by an amplifier (AMP) 31. A signal $(B_2 + B_3)$ indicating the sum of the areas $B_2$, $B_3$ at the light-receiving surface 8a is amplified into a signal B by an AMP 32. A signal $(A - B)$ indicative of the difference between the signals A, B is amplified into a focus error signal (FES) by an AMP 33. The signal FES is phase-compensated by a phase compensating circuit (PHC) 34 and then amplified by a driver circuit (DR) 35 to servo-control the focusing coil 12a.

Figure 5:
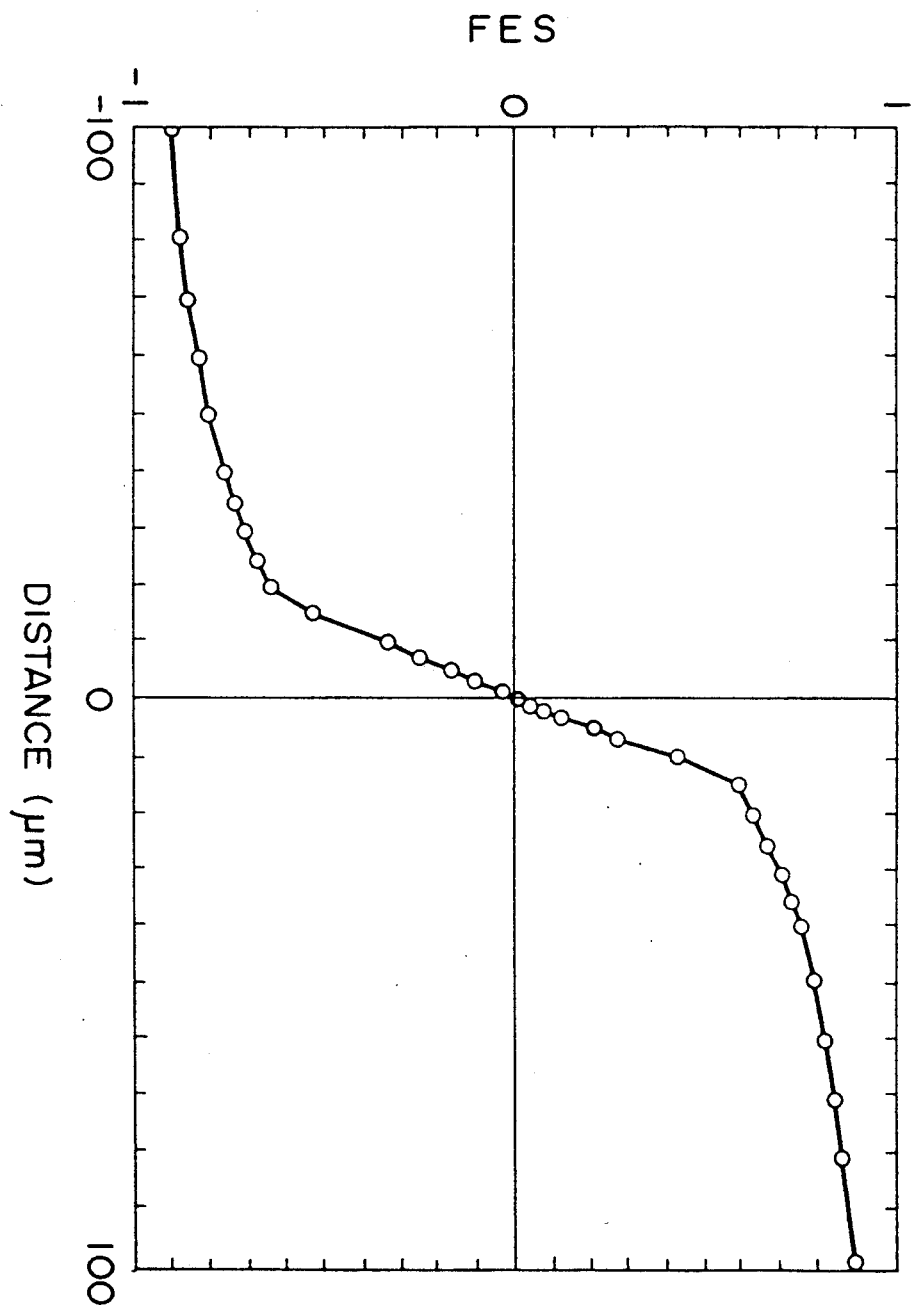
FIG. 5 is a view showing a focusing detection characteristic of the invention.

FIG. 5 is a view showing the focusing detection characteristic of the embodiment. The distance ($\mu$m) between the objective lens 11 and the disk 20 is plotted along the horizontal axis; the focusing point is "0". The FES signal with respect to distance is plotted in normalized form along the vertical axis. As indicated by FIG. 5, a sharply rising (high sensitivity) linear characteristic is obtained within a range of $\pm 20$ $\mu$m of distance 0.

Track position control of objective lens

Track position control in this embodiment is performed by utilizing the signals from the light-receiving surface 7a (or 8a or both). Basically, high-response tracking control is performed by forming the difference signal $(A_3 - A_2)$ between the signals $A_2$, $A_3$ on the inner side of the circle R. Also, a low-frequency component of a difference signal $(A_1 - A_4)$ between the signals $A_1$, $A_4$ on the outer side of the circle R is extracted to perform an offset correction, described below, with respect to the abovementioned tracking control. Servo-locking of the objective lens 11 at the time a seeking operation is also carried out.

Figure 6A:
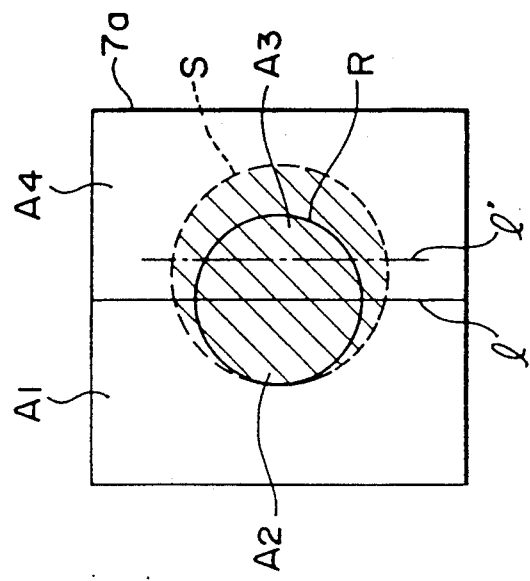
FIGS. 6(A), (B) are views for describing the relationship between radial movement of the objective lens and a returned-light spot.

FIGS. 6(A) and (B) are views for describing the relationship between radial movement of the objective lens 11 and the spot S of returned light. In FIG. 6(A), the objective lens is at the focusing point and the center of the objective lens 11 is situated directly above (or below) the track to be subjected to tracking in a state where there is no lens shift. More specifically, the objective lens 11 is not displaced (shifted) in the radial direction. In this state the center of the objective lens 11 and the optic axis 9 are in coincidence. In addition, the straight line 1 on the light-receiving surface 7a and the projected line 1' that is a diameter of the objective lens also overlap. Moreover, the detected light quantities $A_2$, $A_3$ are in balance. However, if the track being tracked deviates to the left or right for some reason, the balance between the detected light intensities $A_2$, $A_3$ is upset and the center of the objective lens 11 is moved to a point directly above the deviated track by the track error signal (TES), which is produced by detecting the imbalance.

Figure 6B:
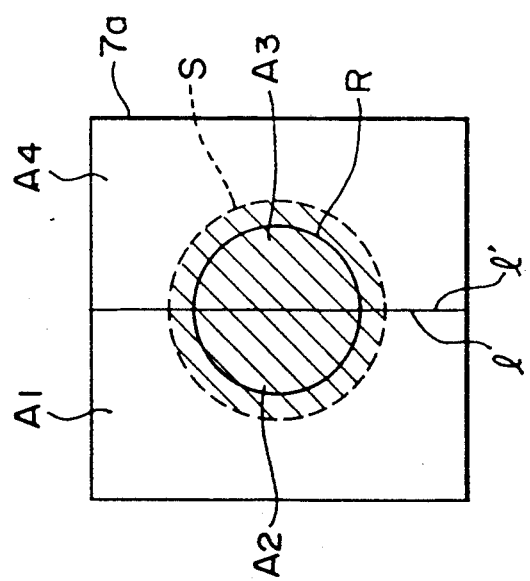

In FIG. 6(B), the objective lens 11 is at the focusing position. However, as a result of a radial displacement applied to the actuator 10, the center of the objective lens is located, in the shifted state, directly above the track undergoing tracking. Since the diameter of the beam emerging from the optical block 3 of this embodiment is sufficiently large, light is condensed on and reflected from the disk surface in a normal manner even if the center of the objective lens 11 deviates from the optic axis 9. However, since the centers of the condensed light and returned luminous flux deviate from the optic axis 9, the center of the returned luminous flux does not pass through the center of the condenser lens 5. Accordingly, the center (the projected line 1' that is a diameter of the objective lens) of the spot S on the light-receiving surface 7a also deviates, as exemplified in FIG. 6(B). However, since the center of the objective lens 11 is already directly above the track undergoing tracking, no further displacement need be applied.

In this regard, the signals $A_2$, $A_3$ on the inner side of the circle R are utilized as the tracking error signal in the present embodiment. However, since a slight difference develops between the detected light quantities in this range, as illustrated, a minute offset is produced. If this were to be employed as the tracking error signal as is, the objective lens 11 would be displaced further by this error signal and tracking would take place at a position slightly displaced from directly above the actual track. This would make accurate tracking impossible. On the other hand, since the detected light quantities $A_1$ and $A_4$ well reflect the amount of shift of objective lens 11, and since the portions of areas $A_2$, $A_3$ are excluded from the light-receiving surface, the difference signal $(A_1 - A_4)$ responds, with a high degree of sensitivity, to the amount of shift in the objective lens 11. By extracting the low-frequency component of the difference signal $(A_1 - A_4)$ and cancelling the abovementioned offset amount by this signal(i.e., moving the straight line 1 electrically to the straight line 1'), the objective lens 11 is made to perform tracking accurately about the straight line 1'.

When the entirety of the optical head performs a seeking operation, servo-locking is necessary so that the actuator 10 (objective lens 11) will not waver on account of mechanical vibration. In this case also, extra servos can be deleted and overall access time shortened if servo-locking is performed at a position which prevails before seeking starts. As set forth above, the low-frequency component of the difference signal ($A_1 - A_4$) well reflects the amount of shift in the objective lens 11. Therefore, in the present embodiment, servo-locking is performed by this signal to lock the actuator 10. After the seeking operation the actuator is released from the servo-locked state and tracking control is performed without delay.

Figure 7:
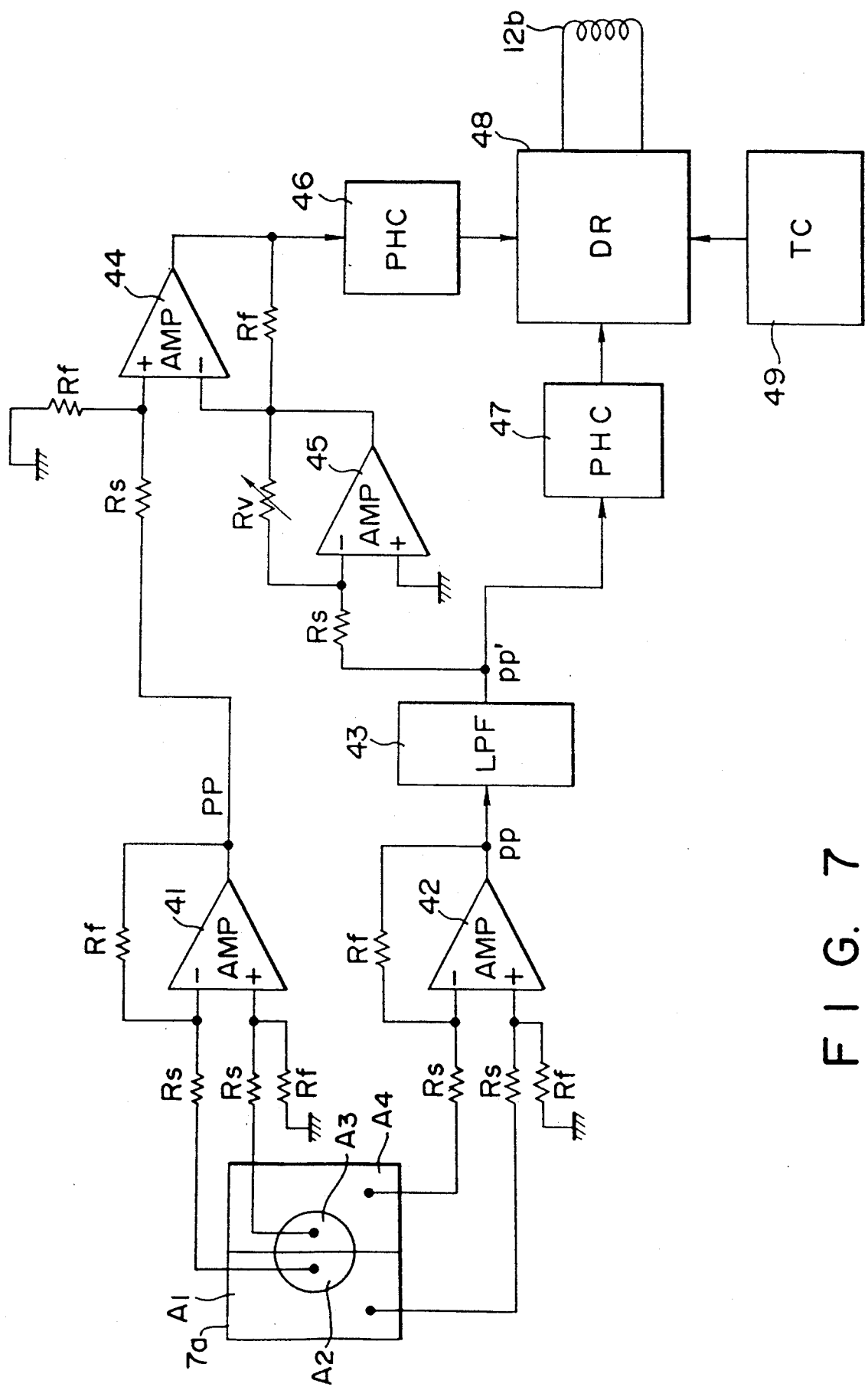
FIG. 7 is a circuit diagram of a track position control circuit according to the embodiment.

FIG. 7 is a circuit diagram of a tracking position control circuit according to the present embodiment. A signal ($A_3 - A_2$) indicating the difference between the areas $A_3$, $A_2$ is amplified into a tracking error signal PP by an AMP 41. The signal PP is subjected to an offset correction, based on a signal pp', in an AMP 44, and is then phase-compensated by a phase compensating circuit (PHC) 46. The resulting signal is fed into a driver circuit (DR) 48 where it is used in tracking control under the control of a timing circuit (TC) 49.

Meanwhile, a signal ($A_1 - A_4$) indicating the difference between the areas $A_1$, $A_4$ is amplified into a signal pp by an AMP 42. This signal is filtered in low-pass filter (LPF) 43 to extract the signal pp', which comprises low-frequency components. The signal pp' is applied to an AMP 45, where it is subjected to inverting amplification. The output of AMP 45 is applied to one input terminal of the AMP 44 and acts to cancel the offset portion of signal PP that is due to lens shift. The signal pp' is also applied to a phase compensating circuit (PHC) 47, where it is phase-compensated before entering the driver circuit 48 to be used in servo-locking of the actuator 10 under the control of the timing circuit 49.

Actuator

FIG. 8(A) is a top view of the actuator portion of the embodiment, and FIG. 8(B) is a side view of the actuator portion of the embodiment. The objective lens 11 is secured to an actuator body 10. The focusing coil 12a is affixed to an end portion of the actuator body 10, and the tracking coil 12b is affixed to the outer side of the focusing coil at two locations. Holding members 13, 14 each comprising a thin plate are secured to the other end of the actuator body so as to lie parallel to each other. A spacer 16 is interposed between the holding members 13, 14. Two hinge portions 13a and two hinge portions 14a of small width are formed at the portions of the respective holding members 13, 14 where these members are connected to the actuator body 10. The other ends of the holding members 13, 14 are connected to an actuator mounting portion 15 by respective single hinge portions 13b, 14b of small width. The holding members 13, 14 are provided at their peripheries with bent reinforcing portions 13c, 14c, respectively, for increasing rigidity.

The four hinge portion 13a, 14a on the lens side and the two hinge portions 13b, 14b on the fixed side flex in the focusing direction (along the Z axis), namely in a direction perpendicular to the planes of the holding members 13, 14. As a result, the objective lens 11 is a capable of being displaced up and down in the focusing direction while the holding members 13, 14 remain parallel and the optic axis is undisturbed.

On the other hand, the hinge portions 13b, 14b on the fixed side flex in the direction of the planes of the holding members 13, 14 (the hinge portions 13a, 14a on the lens side do not flex in the direction of the planes of the holding members 13, 14). As a result, the objective lens 11 describes an arc in the radial direction (along the X axis) of the disk about the hinge portions 13b, 14b. However, since the flexing of the hinge portions 13a, 14a is very small, the objective lens 11 undergoes only slight apparent displacement in the direction perpendicular to the tracks.

Another conceivable displacement mode is rotational displacement caused by the hinge portions 13b, 14b on the fixed side flexing away from each other in the direction of the planes of the holding members. However, even if the flexing in opposite directions occurs in an amount equivalent to that which would cause maximum displacement in the track direction, the length of the hinge portions is no more than 0.5 mm, so that such displacement can be ignored providing that the holding members 13, 14 are spaced far enough apart. For example, if the spacing is 4 mm and the amount of track displacement is 0.5 mm, then the optic axis will not be skewed more than 10 minutes even if all of the force causing the displacement is pointed in the direction of rotation. Accordingly, the actuator 10 of the embodiment should be considered as undergoing displacement substantially in the focusing direction and radial direction alone.

FIG. 9(A) is a top view of an actuator portion of another embodiment, and FIG. 9(B) is a side view of the actuator portion of the other embodiment. Portions similar to those of FIGS. 8(A) and (B) are designated by like reference characters and need not be described again. In the embodiment of FIGS. 8(A) and (B), the hinge portion 13b on the fixed side for displacement in the focusing direction and the hinge portion 13b for displacement in the track direction are common. In the embodiment of FIGS. 9(A) and (B), the center of gravity of the movable portion of the actuator is arranged to coincide with the location of the hinge portion 13b of the mount 15, a balancer 16 is provided on the side opposite the objective lens 11 with the hinge portion 13b (14b) on the fixed side being adopted as a point of symmetry, and the balancer 16 is supported by hinge portions 13d, 14d. Thus, the vibrational modes are simplified and a more stable focusing and tracking servo operation can be achieved.

In this embodiment, a magnetic yoke 17b, a magnet 17a, a focusing coil 18a and a tracking coil 18b are provided, and these are subjected to servo-control which is the reverse of that applied to the objective lens 11. This makes the motion of the actuator 10 quicker and smoother.

Though the hinge portions 13b, 14b on the fixed side are leaf spring members in the foregoing embodiments, the invention is not limited thereto. For example, flexible wires or the like can be used to form these hinge portions.

Further, in the foregoing embodiment, the light-receiving surfaces are partitioned by the straight line l and circle R. However, the invention is not limited to such an arrangement. As long as there is line symmetry with respect to the straight line l, the light-receiving surfaces can be partitioned into an elliptical shape, rhombic shape or the like.

Further, in the forgoing embodiment, the track position control is performed by utilizing the signals from the light-receiving surface 7a only. However, the invention is not limited to such an arrangement. It is possible to make a track position control signal by adding each of the tracking error signal derived from both of the light-receiving surfaces 7a, 8a. In this case, the track position control signal is enhanced. Though the optics on the optical paths reflected from the recording medium are displaced, the system will not be susceptible to the displacement.

Thus, in accordance with the present invention as described above, light is split into two optical paths by a beam splitter, a detector is placed on one optical path on the inner side of the focal point of a condenser lens, another detector is placed on the other optical path on the outer side of the focal point, and the detectors are so arranged that their photoelectric outputs will coincide when an objective lens is focused. As a result, adjustment is easy and accurate focusing detection can be carried out.

Also, each detector has a light-receiving surface the center of which is situated on the respective optic axis, and the light-receiving portion has an area smaller than that of the irradiation pattern of a luminous flux emitted by the condenser lens when the objective is focused. As a result, the system is not susceptible to the adverse effects of birefringence even if the pickup apparatus is used for a magneto-optical disk.

Further, in accordance with the invention, each light-receiving surface is divided into four light-receiving portions by, e.g., a circle whose center is a reference optic axis and whose diameter is smaller than that of luminous flux returned from the disk when an objective is focused, and a straight line, which passes through the center of the circle, in a direction obtained by optically projecting the track direction of the disk. The four light-receiving portions possess approximate line symmetry with respect to the straight line. As a result, the pickup apparatus is simple in structure and is capable of performing position detection of the objective lens in the radial direction, tracking control of the objective lens and servo-locking thereof in an effective manner.

In addition, the pickup apparatus of the invention eliminates the disadvantages of the conventional shaft sliding-type and leaf spring type arrangements, and the actuator is displaced substantially in the focusing and radial directions in a rapid and stable manner while the optic axis thereof is maintained.

As many apparently widely different embodiments of the present invention can be made without departing from the spirit and scope thereof, it is to be understood that the invention is not limited to the specific embodiments thereof except as defined in the appended claims.

What is claimed is:

1. An optical focusing control apparatus for performing focusing control of an objective lens which condenses light on a recording medium and allows reflected light returned from the recording medium to pass therethrough, comprising:

a condenser lens for condensing the returned light which passes through said objective lens;

a beam splitter for splitting light received from said condenser lens into light along first and second optical paths;

a first detector disposed closer to said beam splitter than the focal point of the first optical path of said condenser lens for detecting a quantity of light received from said beam splitter along said optical path;

a second detector disposed further from said beam splitter than the focal point of the second optical path of said condenser lens for detecting a quantity of light received from said beam splitter along said second optical path;

said first detector including a light-receiving surface having a center situated on an optic axis of the first optical path and an area smaller than that of an irradiation pattern of the returned light emerging from said condenser lens;

said second detector including a light-receiving surface having a center situated on an optic axis of the second optical path and an area smaller than that of an irradiation pattern of the returned light emerging from said condenser lens;

said light-receiving surface in said first and second detector divided into four portions by a straight line, which is obtained by projecting a track direction of said recording medium, and a circle which is defined by a circumference of the area smaller than that of an irradiation pattern of the returned light emerging from said condenser lens, two portions of the four portions of said light-receiving surface in said first and second detector, which are defined by the circle, for producing a photoelectric output indicative of the detected quantity of light;

said first and second detectors being disposed in such a manner that the respective photoelectric outputs thereof coincide when said objective lens is focused;

a first adder for receiving the photoelectric output from each of the two portions of said light-receiving surface in said first detector and producing a sum of the photoelectric output;

a second adder for receiving the photoelectric output from each of the two portions of said light-receiving surface in said second detector and producing a sum of the photoelectric output;

a subtracter for producing a difference between the sum of the photoelectric output produced by said first adder and the sum of the photoelectric output produced by said second adder; and said objective lens having its focusing control based on the difference produced by said subtractor.

* * * * *